Patented Feb. 14, 1939

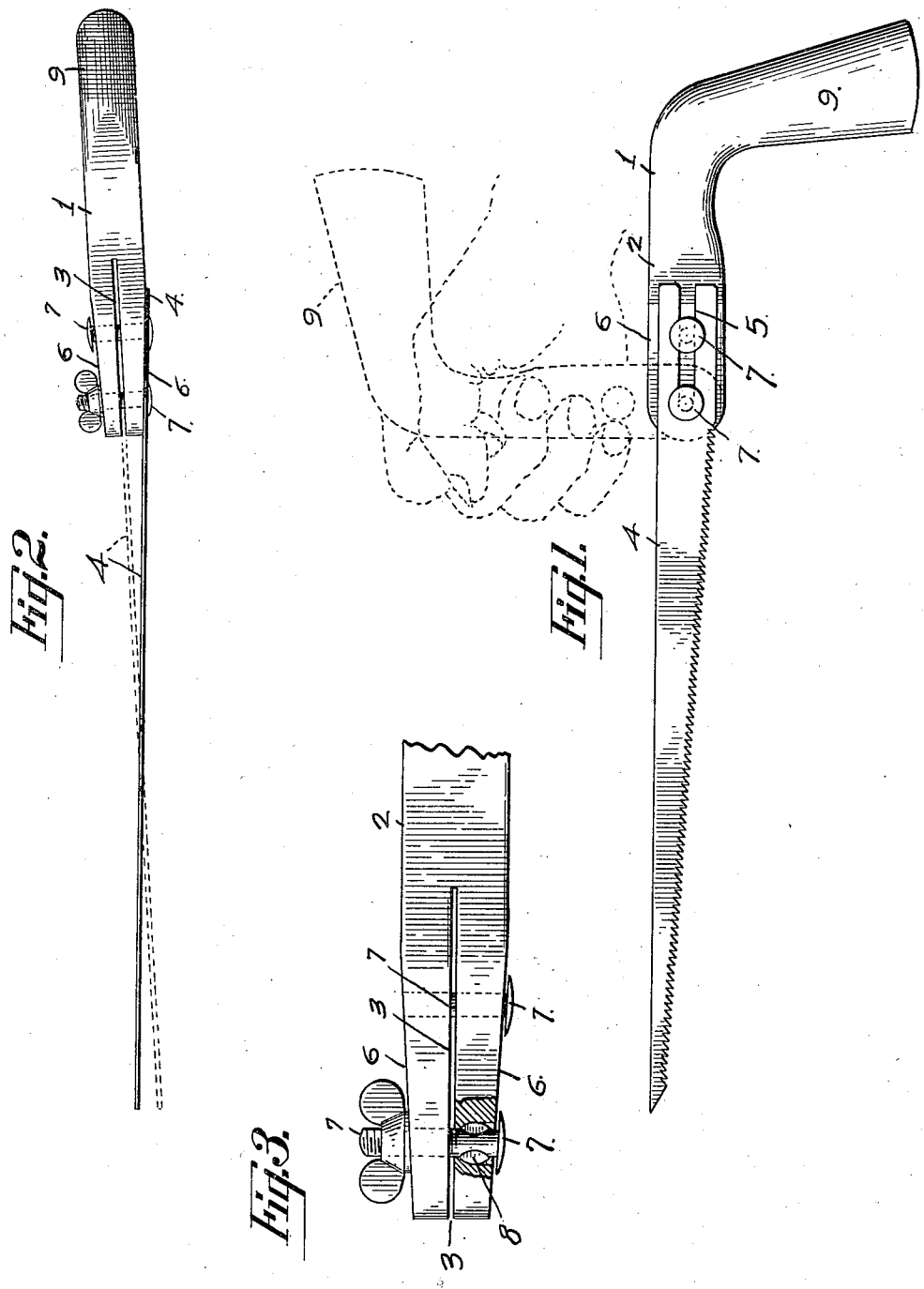

2,146,777

UNITED STATES PATENT OFFICE 2,146,777

SAW HANDLE

Levi W. Strong, San Francisco, Calif.

Application November 9, 1936, Serial No. 109,945

1 Claim. (Cl. 145—108)

My invention relates to a new and improved article of manufacture comprising a saw handle wherein oppositely beveled faces upon opposite sides of the end of a slotted shank operate in conjunction with substantially flush and reversible clamping elements for detachably and reversibly clamping a saw blade to said handle obliquely thereto, whereby said blade more effectively may be held for sawing either right or left handedly flush with or flatly against a flat surface or in crowded or inconveniently inaccessible places.

The primary object of the present invention is to provide a new and improved saw handle having improved means for more conveniently holding a saw blade flush against a flat surface or for sawing in close quarters or other inconvenient places.

Another object of the present invention is to provide a new and improved article of manufacture comprising a saw handle having new and improved means for holding a saw blade in a position for either right or left handed sawing against a flat surface or within inconvenient places.

A further object is to provide a new and improved article of manufacture of the character described which may be easily and economically manufactured and having a maximum efficiency.

I accomplish these and other objects by means of the device disclosed in the drawing forming a part of the present application, and in which—

Fig. 1 is a front elevation of my improved device;

Fig. 2 is a top plan view thereof; and

Fig. 3 is an enlarged broken detailed view, partly in section, of the shank end of said handle.

Referring to the drawing:

The numeral 1 is used to designate in general a saw handle having a substantially straight shank 2 provided with a centrally and longitudinally disposed slot 3 in the end thereof, to receive the slotted butt of the saw blade 4, and having opposite longitudinally beveled faces 6 on opposite sides of the end of said shank 2, as disclosed in Figs. 2 and 3 of the drawing.

The shank is provided with reversible clamping elements 7, one of which may be a threaded bolt pinched to provide oppositely projecting ears or lugs 8 to engage the material of the handle 1 to prevent said bolts from turning while being tightened, said clamping elements 7 having their outer ends lying substantially flush with the outer face of a saw blade 4 clamped against said bevel face 6.

The shank 2 is also provided with a straight butt 9 arranged substantially at right angles with the shank 2 in order to provide a more convenient and a firmer grip for operating said saw.

The shank 2 is also substantially straight in order to provide a similarly convenient and firmer grip when said handle 1 is arranged, for certain sawing operations, with the shank 2 thereof arranged at right angles to the butt of the blade 4, as disclosed in dotted lines in Fig. 1 of the drawing.

In operation:

In order to saw closely to or flush with a flat surface or in inconvenient or awkward quarters where, for instance, a right handed motion or sawing operation is required, the blade 4, provided with the usual slot 5 in the butt thereof, is laid flat against one of the beveled faces 6 with the slot 5 of said saw 4 detachably engaging the clamping elements 7, as disclosed in Fig. 2 of the drawing, and, by means of the clamping elements 7, is firmly clamped flatly against said beveled face 6 and thereby obliquely to the handle 1. This will hold the said handle obliquely to said blade 4 and the flat surface, not shown, against which said blade operates or rests while the handle 1 will be held at an angle to and therefore slightly in spaced relation with said surface to provide clearance for the reciprocating movement of said handle during the sawing operation.

The angle or inclination of the handle may be adjusted, within limits, by further tightening the clamping element 7 nearest the end of the shank 2. This will bring the ends of the inner surfaces of the slot 3 closer together and thereby alter the relative inclination of the beveled faces 6 and consequently the inclination of the longitudinal axis of the handle 1 relatively to the blade.

It should be noted that the blade 4 may be inserted in the slot 3 in the usual manner for compass saws, as disclosed in dotted lines in Fig. 2 of the drawing.

It should also be noted that by the provision of the substantially straight shank 2 a more convenient and firmer grip may be had when the same is turned at right angles to the butt end of the saw blade 4, as used in certain sawing operations.

Having described my invention I claim—

A new article of manufacture comprising a saw handle having longitudinally beveled faces on opposite sides of the end of the shank thereof; and means for clamping a saw blade flatly on either face to hold said handle obliquely to said blade to permit the blade to be held substantially flush against a flat surface while sawing and said handle to be held in spaced relation to said surface.

LEVI W. STRONG.